Dec. 17, 1968  R. J. CONTRUCCI ET AL  3,416,209

CUTTING TOOL

Filed March 24, 1966

INVENTORS
Henry M. Schrier,
Walter H. Kelm, &
Raymond J. Contrucci
Harold J. Holt
ATTORNEY

3,416,209
CUTTING TOOL
Raymond J. Contrucci, Rochester, Walter H. Kelm, Mount Clemens, and Henry M. Schrier, Centerline, Mich., assignors to General Electric Company, a corporation of New York
Filed Mar. 24, 1966, Ser. No. 537,129
5 Claims. (Cl. 29—96)

ABSTRACT OF THE DISCLOSURE

A heavy-duty cutting tool for the machining of metal in which an indexable and invertible cutting insert and cutting insert seat are mounted on a side of the shank of the cutting tool. The insert in its preferred form has an H-shaped cross section and the seat has a complementary shape for full support of the insert. The shape of the insert and seat and the manner in which they are mounted on the toolholder are such as to provide maximum performance in machining operations involving large feeds and depths of cut.

---

This invention relates to a heavy-duty cutting tool and more specifically to a heavy-duty cutting tool in which an invertible and indexable cutting insert and cutting insert seat are mounted in a unique manner on a side surface of the shank of the cutting tool.

Cutting tools of the type used for the machining of metal today widely use so-called disposable inserts, i.e., inserts, mechanically held on the shank of a tool-holder which are indexable to expose a fresh cutting edge after a given cutting edge has been worn or broken in usage and which are invertible to expose a plurality of new cutting edges. In heavy-duty cutting, forces of large magnitude are ordinarily transmitted through the insert to the shank. Because such inserts are normally flat or wafer-shaped, and because they are normally mounted with their thinnest dimension in a horizontal plane, the cutting forces are often sufficient in magnitude to break the insert or the seat, and sometimes even damage or break the shank. Heavy-duty cutting is ordinarily involved where the feed is approximately 0.030 inch or more and the depth of cut is ½ inch or more, i.e., the thickness of the ribbon or chip of material removed from the work piece is approximately 0.030 inch or more, and ½ inch or more in width. Such breakage can obviously be minimized by increasing the depth of the insert to better withstand the maximum cutting force. However, the cost of the relatively expensive cutting insert increases with the volume or weight of metal it contains, and this obviously increases the cost of the insert.

It is an object of the present invention to provide a cutting tool which utilizes an indexable and invertible insert mounted in such a way on the shank of a toolholder so that heavy-duty cutting is effectively achieved with maximum utilization of the relatively expensive metal from which the cutting insert is made.

It is an additional object of the present invention to provide a cutting tool in which the cutting insert is held on its side with a large dimension of the insert in the direction of the main component of the cutting forces, thus minimizing breakage of cutting inserts, seats, and shanks under heavy-duty cutting conditions.

In general, the foregoing and other objects of the invention are achieved in a cutting tool comprising a shank having a recess at a side of one end thereof for the mounting of a fully indexable and invertible cutting insert. The insert is held on the shank by a pin-type holding means mounted horizontally in the shank of the toolholder. A cutting seat is also disposed in the recess of the shank of the toolholder, such that it rests beneath the cutting insert. The insert is mounted on its side so that the forces of greatest magnitude in the cutting operation are transmitted through a large dimension of the insert, and thence through the cutting insert seat, thus minimizing damage to the insert, the seat, and the shank resulting from the relatively large forces encountered in heavy duty cutting.

These and other objects and advantages of the invention will become apparent from the discussion of the invention which follows in conjunction with the accompanying drawing in which FIGURE 1 is a fragmentary plan view of a preferred embodiment of the instant invention;

Figure 1:
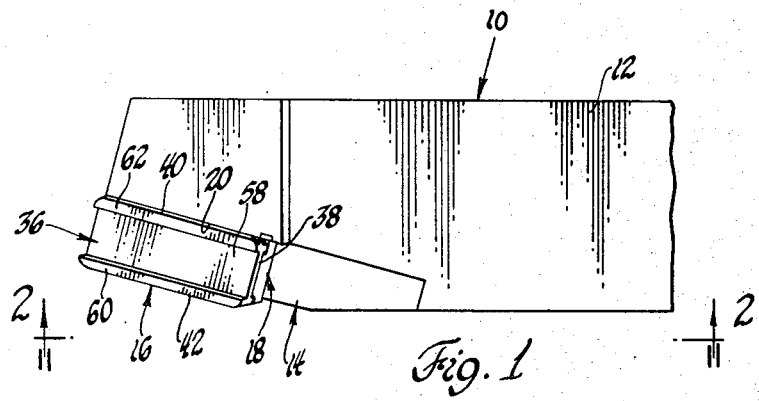
Figure 2:
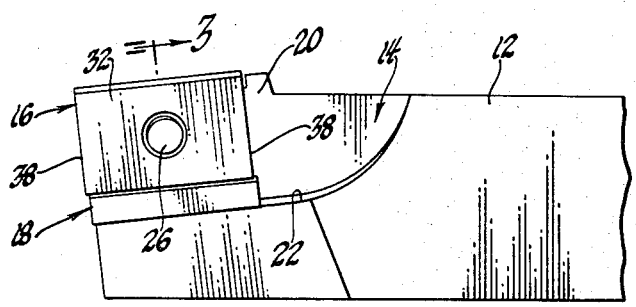
FIGURE 2 is a view taken substantially along line 2—2 of FIG. 1.

Referring now to the drawings wherein like numerals indicate like or corresponding parts throughout the several views, a preferred embodiment of the cutting tool of the invention is generally shown at 10. The cutting tool 10 includes a shank 12 which in turn includes a recess at a side of one end thereof which is generally shown at 14. An invertible and indexable cutting insert generally indicated at 16 and a cutting insert seat generally indicated at 18 are disposed in the recess 14. The recess 14 is defined by a side-locking shoulder surface 20 and a base surface 22, the base surface 22 being angularly related, i.e., substantially normal, to the side-locking shoulder 20.

Figure 3:
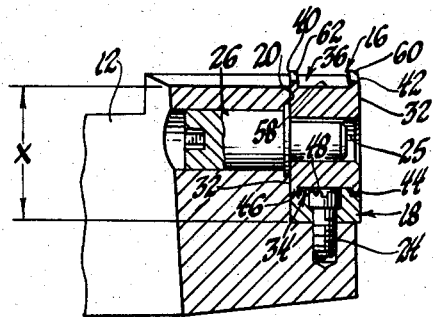
FIGURE 3 is a fragmentary cross-sectional view taken substantially along line 3—3 of FIG. 2.

The seat 18 is secured against the base surface 22 by an appropriate means such as the screw 24 (FIG. 3). The insert 16, which is preferably of cemented tungsten carbide, is retained in the recess 14 and against the side-locking shoulder 20 by the pin 26 which extends through the hole 25 in the insert. The insert 16 should be secured in the recess 14 by a pin-type fastener, examples of which are disclosed in U.S. Patent 3,097,417 and in application Ser. No. 433,117, filed Feb. 16, 1965, now Patent No. 3,341,920, in the name of Walter H. Kelm and assigned to the assignee of the instant invention.

The seat 18 includes a raised section 28 disposed between adjacent lower sections 30. The insert 16 includes spaced parallel side faces 32 which are interconnected by a plurality of edge surfaces collectively referred to herein as the peripheral surface. More specifically, there is included first and second parallel edge surfaces generally shown at 34 and 36, and a pair of parallel edge surfaces 38 which are perpendicular to and extend between the first and second edge surfaces 34 and 36. The junctures between the edge surface 36 and the side faces 32 define the cutting edges 40 and 42, and the junctures between the edge surface 34 and the side faces 32 define the cutting edges 44 and 46. The insert 16 includes a first recess 48 disposed between the cutting edges 44 and 46, which are associated with the first edge surface 34, for defining the raised portions 50 and 52. The raised portion 50 extends toward the recess 48 from the cutting edge 44 and the raised portion 52 extends toward the recess 48 from the cutting edge 46.

The raised section 28 of the seat 18 is in contact with the recess 48 of the first edge surface 34. The lower sections 30 of the seat 18 are disposed in spaced relation to the cutting edges 44 and 46 and are also disposed in spaced relation to the raised portions 50 and 52. Additionally, the raised section 28 of the seat 18 is in lateral spaced relation to the raised portions 50 and 52. Thus, the only contact between the seat 18 and the insert 16 is at the abutment between the raised section 28 of the seat 18 and the recess 48 in the edge surface 34.

The second edge surface 36 includes a second recess 58 which is disposed between the cutting edges 40 and 42 for defining the raised portions 60 and 62. The raised portions 60 and 62 respectively extend toward the recess 58 from the respective cutting edges 42 and 40, the cutting edge 42 being in position for cutting engagement with the work piece.

It will be noted, therefore, that the insert has a substantially H-shaped cross section as defined by a plane perpendicular to a cutting edge and passing through the insert. These inserts are the subject of a copending patent application S.N. 537,186 filed March 24, 1966 of even date herewith in the name of Henry M. Schrier.

The "side," "top," "bottom," "height," and "width" of the cutting tool and insert are obviously dependent on the manner in which the cutting tool is positioned. However, for convenience of reference, these terms are used in the specification and claims with reference to the normal position of the cutting tool as illustrated in the various views of the drawing.

A cutting insert of the truly disposable type is wafer- or disc-shaped so that one dimension is almost always less than ½ of the remaining two dimensions. Inserts of the present invention retain this dimensional relationship. However, the insert is mounted on its side so that the smallest dimension is not in the direction of the major cutting force. The small dimension in the present tools is in the vertical rather than the horizontal dimension. The main component of the cutting forces or the so-called "tangential" cutting force (that force which is tangent to the work piece at the point of cutting) is in a direction indicated by the arrow in FIG. 4.

Figure 4:
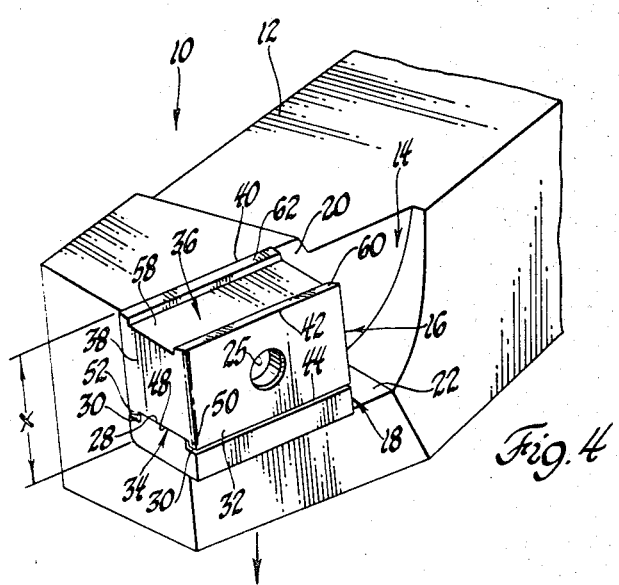
FIGURE 4 is a perspective view of the embodiment illustrated in FIGS. 1 through 3.

It will be seen from the above that the cutting tool of the present invention makes possible taking the greatest depth of cut with the smallest amount of metal contained in the relatively expensive cutting insert. This is possible because a large dimension of the insert is in the direction of the main component of the cutting forces and, in addition, because the insert is indexable and invertible to utilize all of the cutting edges on the cutting insert. Because of the manner in which the insert is mounted on the shank, damage to the shank is minimized because the shank is separated from the work piece by a relatively large dimension of the cutting insert and seat, i.e., the distance X as shown in FIGS. 3 and 4, a distance greater than ½ the total distance through the shank. Thus, the forces acting on the insert and the seat have their major component through a relatively large volume of the cemented carbide insert. In addition, the major component of cutting force is also directed through the seat 18 which may be of, for example, high-speed steel or cemented carbide.

As is well known in the art, the position in which the insert is mounted determines the position of the surfaces defining the exposed cutting edge, and this position may be controlled so that the cutting tool has a positive or a negative rake. In addition, the angle between the surfaces defining each cutting edge of an insert also may be controlled to determine the rake of the particular insert, whether it be positive or negative. Accordingly, each of the raised portions 50, 52, 60 and 62 has an upper flat surface extending from the associated cutting edge toward the adjacent recess, and, although the surface may be disposed parallel to the flat surface of the recesses, it may also be disposed at an angle with the plane of the adjacent recess for providing positive and negative rakes.

It is also understood that the depth of the recesses 48 and 58, and hence the thickness of the raised portions, may vary according to the cutting conditions in which the insert is to be utilized. In fact, in practice the depth of the recess, of the order of 0.002 to 0.020 inch, is very shallow.

The foregoing is a description of illustrative embodiments of the invention, and it is applicant's intention in the appended claims to cover all forms which fall within the scope of the invention.

What we claim as new and desire to secure by Letters Patent of the United States is:

1. A cutting tool consisting essentially of a shank having a recess at a side of one end thereof, said recess being defined by a base surface and a side-locking shoulder surface angularly related to each other, an indexable and invertible cutting insert having spaced side faces and a peripheral surface disposed between said side faces, the peripheral surface including a plurality of flat-edge surfaces, the junctures of said side faces and said flat-edge surfaces defining a plurality of cutting edges, the height of the side faces of said insert being greater than the width of the peripheral surfaces of said insert, two opposite flat-edge surfaces having a planar recess disposed between the cutting edges defining raised portions respectively extending towards said recess from the cutting edges, a seat for said cutting insert disposed against said base surface, the seat including a planar raised section disposed between lower sections, the insert resting in the recess with an edge surface against said seat and a side face of the insert against the side-locking shoulder of the recess, said raised section of the seat being in contact with the recess on the edge surface of the insert, and means for securing said insert and said seat in said recess.

2. A cutting tool as set forth in claim 1 including independent means for securing said seat in the recess of the shank of said cutting tool.

3. A cutting tool as set forth in claim 1 in which the width of the peripheral surface of the insert is less than ½ the height of the side faces of the insert.

4. A cutting tool as set forth in claim 1, wherein the side-locking shoulder surface of said recess extends into said shank a distance greater than ½ the distance through said shank.

5. A cutting tool as set forth in claim 1 wherein the means for securing said insert is a pin-type means extending through a hole in said insert from one side face to the other and co-acting with said shank to retain the insert in said recess.

References Cited

UNITED STATES PATENTS

| | | | |
|---|---|---|---|
| 1,756,516 | 4/1930 | Klopstock | 29—95 |
| 2,688,791 | 9/1951 | Luers. | |
| 2,891,300 | 6/1959 | Shephard | 29—95 |
| 3,060,554 | 10/1962 | Kirchner | 29—96 |
| 3,097,417 | 7/1963 | Hill | 29—96 |
| 3,142,110 | 7/1964 | Hertel | 29—96 |
| 3,187,406 | 6/1965 | Franko | 29—95 |
| 3,188,717 | 6/1965 | Heinlein | 29—96 |
| 3,226,797 | 1/1966 | Hertel | 29—95 |

HARRISON L. HINSON, *Primary Examiner.*